United States Patent Office 3,462,382
Patented Aug. 19, 1969

3,462,382
TRIS - SUBSTITUTED RESORCINOL COMPOUND AND THE MODIFICATION OF RUBBER THEREWITH
Alfred Kolka, Pittsburgh, Wun T. Tai, Monroeville, and Roy H. Moult, Murrysville, Pa., assignors to Koppers Company, Inc., a corporation of Delaware
No Drawing. Filed July 15, 1966, Ser. No. 565,396
Int. Cl. C08c 9/16; C08d 9/16
U.S. Cl. 260—3
2 Claims

ABSTRACT OF THE DISCLOSURE

The adhesion of rubber to tire cords is improved by the incorporation of tris(morpholinomethyl) resorcinol into the rubber.

This invention relates to the modification of rubber compositions. More specifically, it relates to the addition of tris(morpholinomethyl) resorcinol to a modified rubber composition for the purpose of improving the adhesion of rubber compositions to tire cord fabrics and to improve the physical properties of said rubber.

C. Danielson, U.S. Patent 3,018,207 discloses that resorcinol or resorcinol resins when cured by means of methyleneaminocetonitrile provided enhanced adhesion of textile cord to the resulting rubber stock. Problems arise when such an amino compound is employed because of the toxicity of these amino compounds.

We have discovered that tris(morpholinomethyl) resorcinol, when added to rubber compositions containing resorcinol, a resorcinol resin or other polymerizable reinforcing additive, increases the adhesion of the resulting rubber stocks to textile tire cords. In addition to the improved adhesion, the resulting rubber compositions have a lower modulus value than unmodified rubber. Since the modulus value is a measure of stiffness or lack of flexibility of rubber compounds, a decrease in modulus value provide for longer life of textile tire cords. R. Patterson and R. Anderson recognize in their article "Fatigue Failure in Nylon Reinforced Tires," Rubber Chemistry and Technology, vol. 38, No. 4, November 1965, that the stiffness of the region surrounding a cord influences significantly the fatiguing rate of the cord.

In addition, the percent of elongation of these compositions is increased by the use of tris(morpholinomethyl) resorcinol as a curing agent.

The curing agent of our invention is tris(morpholinomethyl) resorcinol and is characterized by the formula:

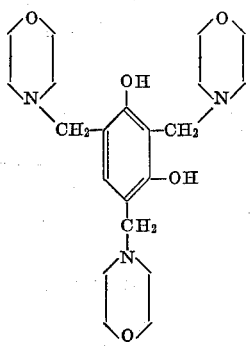

The general preparation of this compound involves the reaction of one mole or resorcinol and three moles each of paraformaldehyde and morpholine in isopropanol at reflux temperature, the time of the reaction being about one and one-half hours. When employed in resorcinol or resorcinol resin modified rubber composition, this compound acts as a curing agent and causes the formation of unusual and exceptional physical properties in the resultant composition.

The rubber component to which the reinforcing additive and the tris(morpholinomethyl) resorcinol is added may be any of the various types of rubber substrates including natural rubber and synthetic rubbers such as styrene-butadiene rubbers, polybutadiene rubber, butyl-ethylene-propylene terpolymers, and the synthetic natural polyisoprene rubbers. Reclaims of the above-mentioned rubber compositions are also used.

In addition to resorcinol, and resorcinol-aldehyde resins as the polymerizable reinforcing additive, other meta-substituted benzene compounds containing hydroxy or amino radicals may be used, as may be polyhydroxydiphenyls, polyhydroxynaphthalenes such as 1,5-naphthalenediol, and suitable polymerizable alkylated phenols, as for example 3,5-xylenol.

In producing the improved rubber compositions of our invention, the resorcinol resin or other reinforcing agent is intimately mixed with the rubber hydrocarbon constituents in an intensive mixer such as a Banbury mixer, or by means of milling rolls or the like. Although, the tris(morpholinomethyl) resorcinol may be mixed in at this stage of the processing, better results are generally obtained when it is added during the final mixing with the normal curing agents (sulfur and accelerators) on the milling rolls, and at lower temperatures. Mixing for longer times or at higher temperatures is not generally advantageous or deleterious to the product. The fact that these curing agents can be added at higher temperatures results in easier processing of the modified rubber compositions and is advantageous over other curing agents which tend to precure and results in scorching.

The preferred amount of resorcinol, resorcinol-formaldehyde resin, or other polymerizable reinforcing additive added to the rubber stock is in the order of two parts by weight for each one hundred parts of the hydrocarbon type rubber components (i.e. the total of the raw material rubber and synthetic rubber) in the rubber composition. The use of twice as much or one-half as much of the polymerizable reinforcing additive also has a beneficial effect upon the rubber composition, but the properties are less than optimum.

The tris(morpholinomethyl) resorcinol is added in amount of about 10 parts per hundred parts of resorcinol, resorcinol resin or other polymerizable reinforcing additive. An increase of the amount to about fifty parts per one hundred parts of resorcinol or other resin did not result in any substantial improvements in the properties of the resulting compositions.

The modified rubber compositions of our invention show enhanced adhesion and physical property modification with textile tire cords such as rayon or other synthetic fibers such as nylon and polyester fibers. Enhanced adhesion is also provided with other tire cords such as glass fiber or metal cords.

The H-test has been employed by the rubber industry to determine the static adhesion of textile tire cords to rubber. This test is specified as ASTM D2138-62-T and was employed in testing the adhesion of the rubber compositions of this invention. The higher the H-test value, the stronger the adhesion of the rubber coating to the cord.

In the physical testing of the rubber compositions of our invention, the material was sheeted out at 45 mils thickness and was molded in standard ASTM slabs according to Method ASTM D-15.

These slabs were cured at 293° F. for periods of 30 and 45 minutes. The tensile strength, modulus at 300% stretch, elongation at break, and set at break were determined according to ASTM D-412-62T. The hardness of

EXAMPLE I

A mixture of paraformaldehyde (9.0 g., 0.30 mole) morpholine (26.1 g., 0.30 mole) and 20 ml. of isopropanol was heated in a steam bath until a homogeneous solution resulted. A solution of resorcinol (11.0 g., 0.10 mole) in 50 ml. of isopropanol was added and the resultant solution refluxed on a steam bath for 1.5 hours. The hot solution was then concentrated on a rotary evaporator at about 60°/15 mm. and finally at about 60°/2 mm. The glassy residue was triturated with ether, filtered and washed with ether (40 ml) to yield crude tris(morpholinomethyl) resorcinol, M.P. 132–135°, 37.26 g. (91.6%), a white solid. Recrystallization once from isopropanol yielded a white solid having a melting point of 134–138°, 33.38 g. (81.2%). Removal of ether from ether washings yielded 2.48 g. of solids, M.P. 91–145° [impure tris(morpholinomethyl) resorcinol]. Mixed M.P. of the tris(morpholinomethyl) resorcinol M.P. 134–138° with 2,6-bis(morpholinomethyl) resorcinol was 122–132°; with trioxymethylene, it was 124–132°; and with resorcinol 69–75°. An analytical sample having a melting point of 137–139° was obtained by recrystallization of the crude product several times from isopropanol.

The tris(morpholinomethyl) resorcinol was analyzed by infra-red (KBr) and by nuclear magnetic resonance (acetone —$d_6$), and the results were consistent with the structure of 2,4,6-tris(morpholinomethyl) resorcinol. Elemental analysis results were: Calc'd. as $C_{21}H_{33}N_3O_5$; C, 61.89; H, 8.16; N, 10.32; and the values found were C, 61.73; H, 8.04 and H, 10.09. Molecular weight calc'd as 407.5; found by vapor phase osmometry 389±5.

EXAMPLE II

A rubber composition was formed containing the following ingredients:

| | Parts (by wt.) |
|---|---|
| Styrene-butadiene rubber, Synpol 1551 (an oil extended type) | 60 |
| Smoked Sheet No. IRSS (Standard quality natural rubber) | 60 |
| Reclaim Rubber (Whole tire, first quality) | 36 |
| Carbon black, Continex SRF/HM | 48 |
| Octamine (Naugatuck) | 1.2 |
| Zinc Oxide | 6 |
| Stearic Acid | 1.8 |
| Pine Tar (Tarene No. 40) | 4.8 |
| Light Process Oil (Sunoco Circo Light) | 4.8 |

The above ingredients were mixed for 10 minutes in a Banbury mixer, the temperature rising to 320° F. during this period. The following ingredients were added when the masterbatch rubber was being milled on Farrell-Birmingham rolls at a temperature of 180° F.

| | Parts (by wt.) |
|---|---|
| Sulfur (Rubbermaker's) | 4.5 |
| Delac S Prills (Naugatuck) | 1.32 |

This composition was designated "control."

EXAMPLE III

A composition was formed corresponding to this composition, prior to mixing, of Example II. To this composition there was added 2.4 parts by weight of a conventional resorcinol-formaldehyde resin prepared generally according to the procedure described by P.H. Rhodes, in U.S. 2,385,372. The composition was mixed as in Example II, except that during the mixing, 0.24 part by weight of tris(morpholinomethyl) resorcinol (Example I) was added. This composition was designated as Composition A.

EXAMPLE IV

A composition was prepared using the ingredients and processing of Composition A (Example III), except that trimeric methyleneaminoacetonitrile (U.S. 3,018,207) was used in place of tris(morpholinomethyl) resorcinol. This composition was designated as Composition B.

EXAMPLE V

The composition of Examples II, III, and IV were sheeted out at 45 mil thickness for physical tests and for adhesion evaluations. Comparison of the physical properties of the two modified rubber compositions and the control were made. Tensile strengths, modulus at 300% stretch, elongation at break, and set at break were determined according to ASTM D–412–62T. Hardness was determined using a Shore A testing meter, according to ASTM D–676–59T. The results were:

| Physical properties, Cured at 293° F. | Control | Composition A | Composition B |
|---|---|---|---|
| Tensile strength, p.s.i.: | | | |
| 30 min | 2,126 | 2,200 | 2,051 |
| 45 min | 2,150 | 2,102 | 1,974 |
| 300% modulus, p.s.i.: | | | |
| 30 min | 860 | 750 | 1,077 |
| 45 min | 1,100 | 923 | 1,195 |
| Elongation, percent: | | | |
| 30 min | 426 | 583 | 475 |
| 45 min | 480 | 500 | 435 |
| Set at break: | | | |
| 30 min | 22 | 29 | 21 |
| 45 | 21 | 25 | 19 |
| Shore A hardness: | | | |
| 30 min | 59 | 54 | 63 |
| 45 min | 57 | 55 | 63 |

Thus, the composition cured with tris(morpholinomethyl) resorcinol showed better physical properties, including a decreased modulus value.

EXAMPLE VI

The rubber compositions of Examples II, III, and IV were also compared with respect to static adhesion according to ASTM D–2138–62T. Tire cord, Du Pont nylon type 714 of 840 denier, 2-ply, with 12/12 twist, was treated with a standard laboratory latex dip of the following formula:

| | Weight, grams |
|---|---|
| Resorcinol-formaldehyde resin (75% solids, aqueous solution) | 26.7 |
| Water | 407.7 |
| Formaldehyde, methanol free (37%) | 20.3 |
| Aqueous NaOH Solution (10%) | 8.0 |
| Vinylpyridine Latex (42% solid) (Gen-Tac) | 250.0 |

The nylon cord was treated with low tension thru the dip (40–80 grams), then dried at 430° F. at 119 feet per minute, an exposure time of 19.8 seconds.

Samples of this cord were vulcanized at 293° F. for 45 minutes to provide ¼″ H-test specimens. The results of static adhesion tests were:

H-test (212° F.):
| | |
|---|---|
| Control | 18.3 |
| Composition A | 22.0 |
| Composition B | 20.8 |

As can be seen from the above data, the resorcinol resin modified rubber composition cured with tris(morpholinomethyl) resorcinol exhibited increased static adhesion.

EXAMPLE VII

A composition was prepared corresponding to Composition A of Example III, except that resorcinol was substituted for the resorcinol-formaldehyde resin. Testing of the properties of this composition showed results comparable to those of Composition A.

We claim:
1. A vulcanizable rubber composition for adhesion to tire cord comprising diolefin rubber, 0.5 to 3.0 parts per 100 parts of said rubber of a polymerizable reinforcing additive selected from the group consisting of resorcinol, a resorcinol-aldehyde resin, a polyhydroxynaphthalene, polyhydroxydiphenyls, alkylated phenols, and meta-disubstituted benzenes containing hydroxy or amino groups therein, and 5 to 50 parts per 100 parts of said polymerizable reinforcing additive of tris(morpholinomethyl)-resorcinol.

2. Method of imparting increased adhesion properties to diolefin rubber comprising:
(a) adding to said rubber about 0.5 to 3.0 parts of a polymerizable reinforcing additive selected from the group consisting of resorcinol, a resorcinol-aldehyde resin, a polyhydroxynaphthalene, polyhydroxydiphenyls, alkylated phenols, and meta-disubstituted benzenes containing hydroxy or amino groups to form a mixture thereof: and
(b) adding to said mixture in an amount of 5 to 50 parts per one hundred parts of said polymerizable reinforcing additive, the compound tris(morpholinomethyl) resorcinol.

References Cited

UNITED STATES PATENTS

| | | | |
|---|---|---|---|
| 2,341,907 | 2/1944 | Cheetham et al. | 260—51.5 |
| 2,636,019 | 4/1953 | Butler et al. | 260—54 |
| 3,256,137 | 6/1966 | Danielson | 260—839 |

MURRAY TILLMAN, Primary Examiner

M. J. TULLY, Assistant Examiner

U.S. Cl. X.R.

161—198, 202, 203, 215, 217, 221, 227, 231; 260—54, 94.7, 30.4, 839, 845, 846, 51.5